United States Patent
Yamamoto

(10) Patent No.: US 10,061,504 B2
(45) Date of Patent: Aug. 28, 2018

(54) OPERATION APPARATUS

(71) Applicant: Takuo Yamamoto, Aichi (JP)

(72) Inventor: Takuo Yamamoto, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 338 days.

(21) Appl. No.: 14/652,690

(22) PCT Filed: Jan. 17, 2013

(86) PCT No.: PCT/JP2013/050847
§ 371 (c)(1),
(2) Date: Jun. 16, 2015

(87) PCT Pub. No.: WO2014/112080
PCT Pub. Date: Jul. 24, 2014

(65) Prior Publication Data
US 2015/0339025 A1 Nov. 26, 2015

(51) Int. Cl.
*G06F 3/0488* (2013.01)
*G06F 3/0485* (2013.01)
(Continued)

(52) U.S. Cl.
CPC ............ *G06F 3/0485* (2013.01); *B60K 35/00* (2013.01); *B60K 37/06* (2013.01);
(Continued)

(58) Field of Classification Search
CPC ...... G06F 3/044; G06F 3/0482; G06F 3/0485; G06F 3/03547; G06F 3/0488; B60K 2350/1024
See application file for complete search history.

(56) References Cited

U.S. PATENT DOCUMENTS

2005/0200611 A1   9/2005  Goto et al.
2009/0070704 A1*  3/2009  Ording .................. G06F 3/0485
                                                715/784
(Continued)

FOREIGN PATENT DOCUMENTS

CN      101882018 A    11/2010
CN      102576282 A     7/2012
(Continued)

OTHER PUBLICATIONS

International Search Report of PCT/JP2013/050847 dated Apr. 16, 2013 [PCT/ISA/210].

*Primary Examiner* — Abbas Abdulselam
(74) *Attorney, Agent, or Firm* — Sughrue Mion, PLLC

(57) ABSTRACT

An operation apparatus includes a touch operation surface configured to move in up and down directions, with a sensor for outputting a signal representing a touch of a finger thereon, and with an outer frame element or a dead zone; a downward movement detection part that outputs a signal representing a movement of the touch operation surface in the down direction; and a control device that executes, when the movement of the touch operation surface in the down direction is detected while the touch of the finger on the touch operation surface is not detected, at least one of scrolling lists in an image area or the image area itself displayed in a display that is located remotely with respect to the touch operation surface, changing the image area displayed on the display to another image area, and successively moving a cursor in the image area displayed on the display.

8 Claims, 14 Drawing Sheets

(51) Int. Cl.
*G06F 3/044* (2006.01)
*G06F 3/0482* (2013.01)
*G06F 3/0354* (2013.01)
*B60K 35/00* (2006.01)
*B60K 37/06* (2006.01)

(52) U.S. Cl.
CPC .......... *G06F 3/03547* (2013.01); *G06F 3/044* (2013.01); *G06F 3/0482* (2013.01); *G06F 3/0488* (2013.01); *B60K 2350/1032* (2013.01); *B60K 2350/1052* (2013.01); *B60K 2350/355* (2013.01)

(56) References Cited

U.S. PATENT DOCUMENTS

| | | | |
|---|---|---|---|
| 2009/0128507 | A1 | 5/2009 | Hoshino et al. |
| 2010/0079404 | A1* | 4/2010 | Degner ............... G06F 3/03547 345/174 |
| 2010/0188363 | A1 | 7/2010 | Ikeda et al. |
| 2010/0214249 | A1 | 8/2010 | Ikeda et al. |
| 2010/0275122 | A1* | 10/2010 | Buxton ................ G06F 1/1626 715/728 |
| 2011/0090168 | A1 | 4/2011 | Goto et al. |
| 2012/0023440 | A1 | 1/2012 | Mueller et al. |
| 2012/0026087 | A1 | 2/2012 | Ke |
| 2012/0038578 | A1 | 2/2012 | Goto et al. |
| 2012/0147052 | A1 | 6/2012 | Homma et al. |
| 2012/0154273 | A1 | 6/2012 | McDade, Sr. et al. |
| 2013/0007793 | A1* | 1/2013 | Anthru ................ H04N 5/4403 725/14 |
| 2013/0021282 | A1 | 1/2013 | Goto et al. |
| 2014/0029207 | A1* | 1/2014 | Beraud ................ B60K 37/06 361/728 |
| 2014/0210760 | A1* | 7/2014 | Berg .................... G06F 3/0414 345/173 |
| 2014/0289677 | A1 | 9/2014 | Goto et al. |

FOREIGN PATENT DOCUMENTS

| | | |
|---|---|---|
| EP | 2523072 A1 | 11/2012 |
| JP | 10-198507 A | 7/1998 |
| JP | 2005-4690 A | 1/2005 |
| JP | 2006-029917 A | 2/2006 |
| JP | 2010-176328 A | 8/2010 |
| JP | 2010-191892 A | 9/2010 |
| TW | 201205358 A1 | 2/2012 |

* cited by examiner

FIG.5
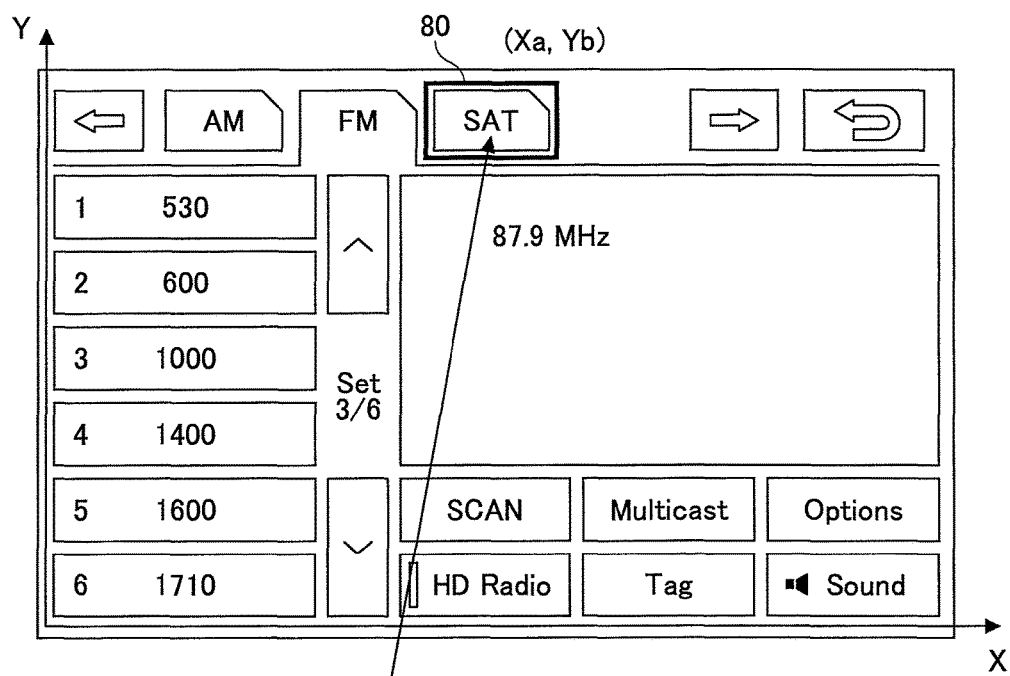
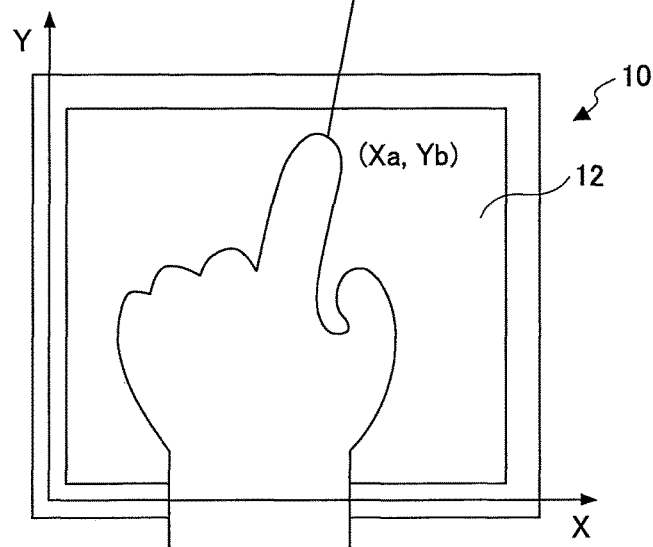

OPERATION APPARATUS

CROSS REFERENCE TO RELATED APPLICATIONS

This application is a National Stage of International Application No. PCT/JP2013/050847, filed Jan. 17, 2013, the contents of which are incorporated herein by reference in its entirety.

TECHNICAL FIELD

The disclosure is related to an operation apparatus.

BACKGROUND ART

A touch sensing type input apparatus including a touch panel is known in which a selection target item in an operation image area displayed on a display is selected with a selection operation on the touch panel to implement an input operation of the selection target item (see Patent Document 1, for example).

[Patent Document 1] Japanese Laid-open Patent Publication No. 2006-029917

DISCLOSURE OF INVENTION

Problem to be Solved by Invention

According to such a type of the touch sensing type input apparatus, in order to scroll a list in the operation image area, a user has to perform, at first, a selection operation for selecting a selection target item used for scrolling in the operation image area, and then perform an enter operation for the selection target item for scrolling. In this case, there is a problem that a plurality of operations are required, resulting in a lack of convenience. For this reason, it is possible to provide scroll switches (mechanical switches) separately in addition to the touch panel; however, providing such scroll switches leads to upsizing of the operation apparatus as a whole, which is not preferable in terms of space availability. Such problems hold true not only for the list scroll operation, but also for other scroll operations, page turning operation, etc.

Therefore, an object of the disclosure is to provide an operation apparatus with which scroll operations, etc., becomes easier with space saving being implemented.

Means to Solve the Problem

According to one aspect of the disclosure, an operation apparatus is provided, which includes:

a touch operation surface that is configured to move in up and down directions, has a sensor provided therein for outputting a signal representing a touch of a finger thereon, and has an outer frame element or a dead zone provided at an outer region thereof, the frame element or the dead zone not causing the signal of the sensor to be output even when the finger touches thereon;

a downward movement detection part that outputs a signal representing a movement of the touch operation surface in the down direction; and a control device that executes, when the movement of the touch operation surface in the down direction is detected based on the signal output from the downward movement detection part while the touch of the finger on the touch operation surface is not detected based on the signal output from the sensor, at least one of scrolling lists in an image area or the image area itself displayed in a display that is located remotely with respect to the touch operation surface, changing the image area displayed on the display to another image area, and successively moving a cursor in the image area displayed on the display.

Advantage of the Invention

According to the disclosure, an operation apparatus is obtained which makes scroll operations, etc., easier while implementing space saving.

BRIEF DESCRIPTION OF DRAWINGS

FIG. 5 is a diagram for schematically illustrating the display 20 and the touch pad 10 and for conceptually illustrating an example of an operation in an absolute coordinate mode.

Figure 1:
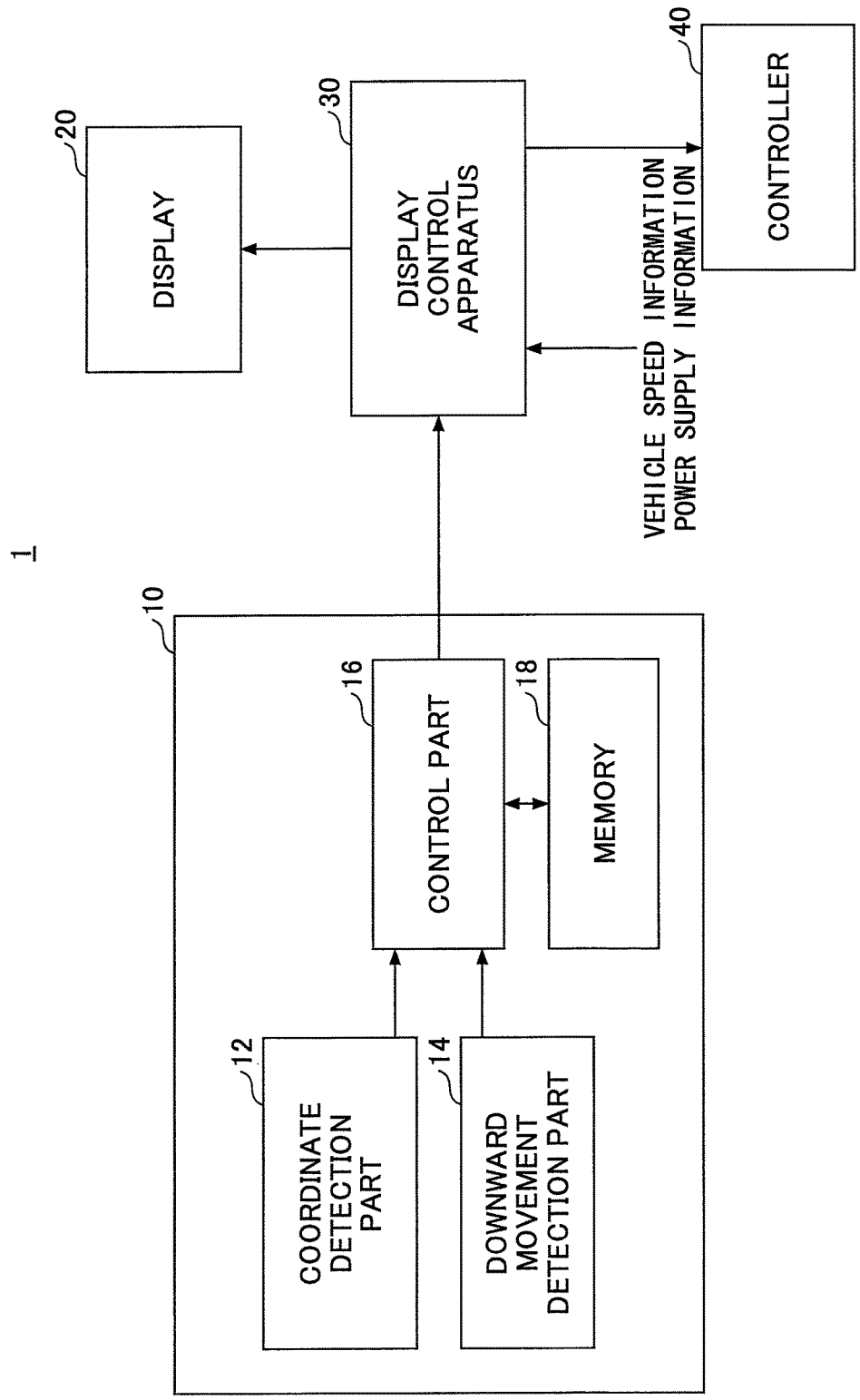
FIG. 1 is a diagram for schematically illustrating a system configuration of an operation apparatus for vehicle 1 according to an embodiment.

DESCRIPTION OF REFERENCE SYMBOLS 1 operation apparatus for vehicle
10, 110 touch pad
12 coordinate detection part
14 downward movement detection part
15a first portion
15b second portion 16 control part
18 memory
20 display
30 display control apparatus
40 controller
50 outer frame element
52 stopper
54 elastic element
60 substrate
71a through 71f list
72 button for scrolling
80 cursor
82 pointer
90 list display area
120 dead zone

BEST MODE FOR CARRYING OUT THE
INVENTION

In the following, embodiments are described in detail with reference to appended drawings.

Figure 2:
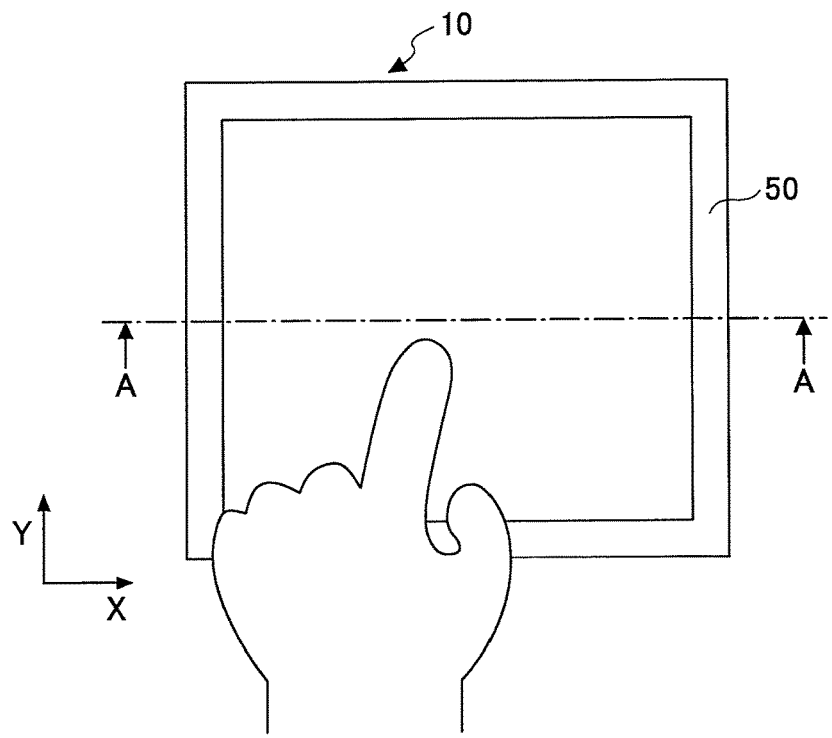
FIG. 2 is a plan view for schematically illustrating a touch pad 10.
Figure 3:
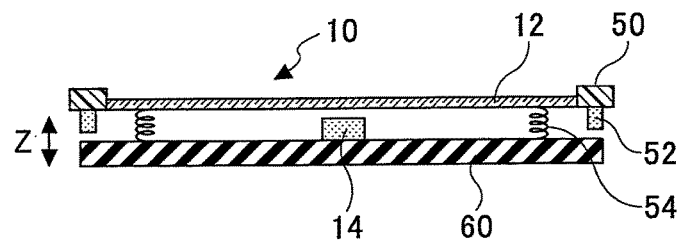
FIG. 3 is a cross-sectional view for schematically illustrating a cross section of a main part of the touch pad 10.
Figure 4:
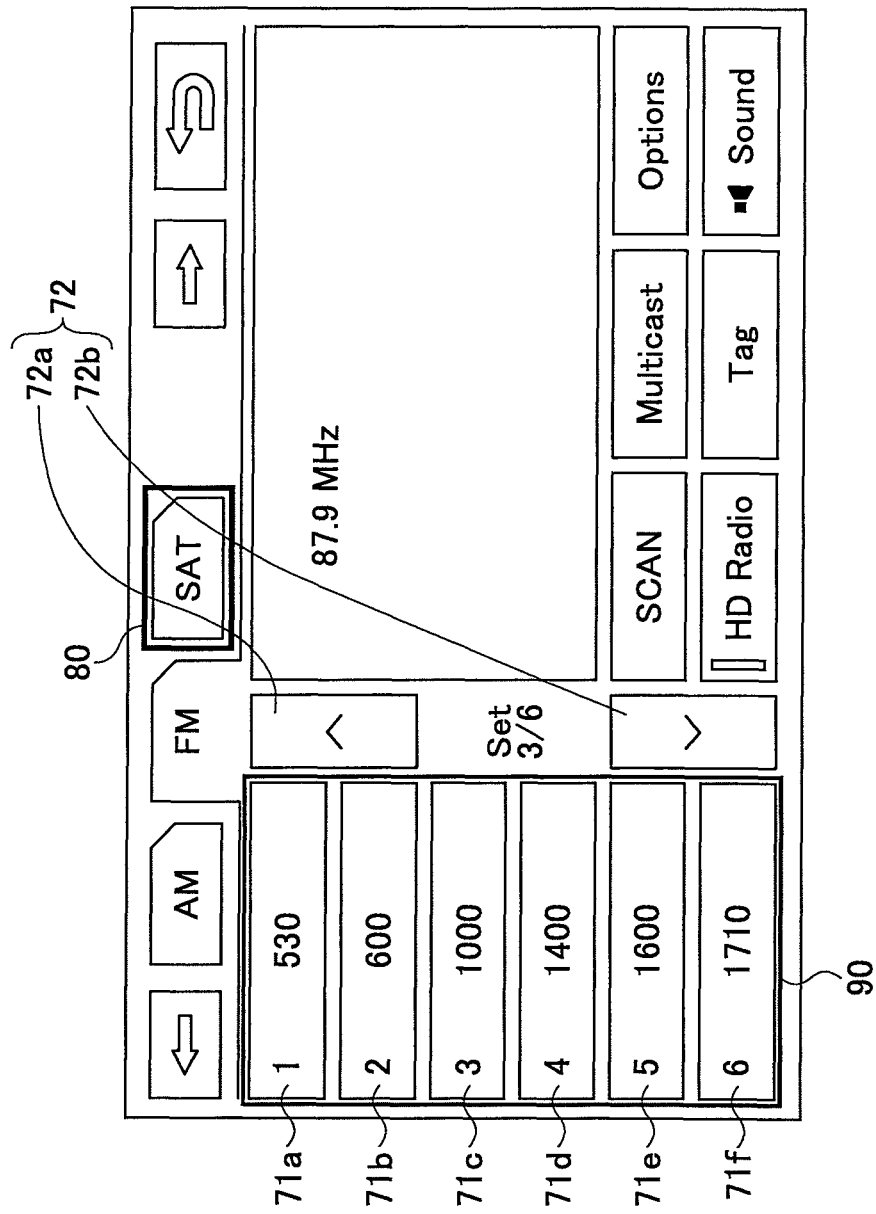
FIG. 4 is a diagram for schematically illustrating an example of an operation image area displayed on a display 20.

FIG. 1 is a diagram for schematically illustrating a system configuration of an operation apparatus for vehicle 1 according to an embodiment. FIG. 2 is a plan view for schematically illustrating a touch pad 10. FIG. 3 is a cross-sectional view for schematically illustrating a cross section of a main part of the touch pad 10. It is noted that, in FIG. 2, a hand operating a coordinate detection part 12 (touch operation surface) of the touch pad 10 is schematically illustrated; however, it is not illustrated in FIG. 3. FIG. 4 is a diagram for schematically illustrating an example of an operation image area displayed on a display 20. FIG. 5 is a diagram for schematically illustrating the display 20 and the touch pad 10 and for conceptually illustrating an example of an operation in an absolute coordinate mode.

The operation apparatus for vehicle 1 includes the touch pad 10, the display 20, and a display control apparatus 30.

The touch pad 10 is provided at an appropriate place in a cabin. Preferably, the touch pad 10 is provided at a place where a driver can easily operate it (the driver can extend a hand to reach it with a driving posture being kept). The touch pad 10 is typically disposed at a place where an operator can extend his/her hand from a nearer side of the touch pad 10 to operate the touch pad 10. The touch pad 10 may be disposed at or around a console box, for example. The touch pad 10 includes the coordinate detection part 12, a downward movement detection part 14, a control part 16 and a memory 18. Further, the touch pad 10 includes the outer frame element 50, a stopper 52, an elastic element 54, and a substrate 60, as illustrated in FIG. 2.

The coordinate detection part 12 includes a substantially planer two-dimensional operation surface (touch operation surface) on a top side thereof, illustrated in FIG. 2. An electrostatic capacitance type sensor is provided in the touch operation surface. The output signal of the electrostatic capacitance type sensor is transmitted to the control part 16. The coordinate detection part 12 is formed by an electrostatic capacitance type pad, for example. The electrostatic capacitance type pad has such a construction that electrodes (i.e., the electrostatic capacitance type sensor) extend linearly in x and y directions in a plane with insulation bodies being sandwiched therebetween, for example. When a finger of a human comes close to the electrodes via an insulating panel, a condenser is formed with the electrode and the plate formed of the finger and an electrical charge amount (and thus electrostatic capacitance) of the electrode is changed. In this case, detection signals of the electrodes (i.e., a signal representing a change amount of the charge accumulated in the electrode) may be transmitted to the control part 16.

The coordinate detection part 12 is configured such that the coordinate detection part 12 can move in up and down directions (Z direction illustrated in FIG. 3). A mechanism for enabling the coordinate detection part 12 to move in the up and down direction may be arbitrary. In the example illustrated in FIG. 3, the coordinate detection part 12 is supported by the substrate 60 via the elastic element 54. The stroke of the up and down movements of the coordinate detection part 12 may be arbitrary and may be slight.

The outer frame element 50 is provided at an outer region of the coordinate detection part 12. Preferably, the outer frame element 50 is provided such that the outer frame element 50 protrudes upward with respect to the touch operation surface of the coordinate detection part 12, as illustrated in FIG. 3. Further, preferably, the outer frame element 50 protrudes upward with respect to a surface surrounding the touch pad 10 (i.e., the surface of the console box around the touch pad 10, if the touch pad 10 is provided in the console box, for example). The outer frame element 50 may be attached to the coordinate detection part 12 such that the outer frame element 50 is integrated with the coordinate detection part 12. For example, the outer frame element 50 may be coupled to the outer region of the coordinate detection part 12 by means of fit, an adhesive, or a fastener such as a screw, etc. Further, the outer frame element 50 may be attached such that the outer frame element 50 is provided on the touch operation surface (i.e., the outer frame element 50 covers the outer region of the touch operation surface), or the outer frame element 50 may be attached to a side portion (side surface) of the outer region of the touch operation surface such that the outer frame element 50 does not cover the outer region of the touch operation surface. Further, the outer frame element 50 may be formed of an arbitrary material, and may be formed of a material that is different from that of the coordinate detection part 12. Further, the outer frame element 50 may be formed integrally and simultaneously with the coordinate detection part 12. It is noted that the outer frame element 50 is configured such that the outer frame element 50 can move in the up and down directions together with the coordinate detection part 12, because the touch pad 10 is provided integrally with the coordinate detection part 12.

The stopper 52 restricts the stroke of the up and down movements of the outer frame element 50 and the coordinate detection part 12. In the example illustrated in FIG. 3, the stopper 52 is provided below the outer frame element 50. However, the stopper 52 may be provided below the coordinate detection part 12. The outer frame element 50 and the coordinate detection part 12 restrict the down movement by the stopper 52 abutting the upper surface of the substrate 60. It is noted that the stopper mechanism can be varied, and other stopper mechanisms may be used. Further, another stopper mechanism for restricting the up movement of the outer frame element 50 and the coordinate detection part 12 may be added. Further, a guide mechanism for guiding the up and down movements of the outer frame element 50 and the coordinate detection part 12 may be added. Further, a mechanism for generating a click feeling (or a vibration) upon the outer frame element 50 and the coordinate detection part 12 moving in the down direction more than a predetermined amount may be added.

The elastic element 54 may be formed by an arbitrary spring such as a plate spring, a coil spring, etc., or may be formed of a rubber or a soft resin. The elastic element 54 presses the coordinate detection part 12 in the up direction such that the coordinate detection part 12 is kept at its nominal height.

The downward movement detection part 14 outputs a signal representing the down movement of the outer frame element 50 and the coordinate detection part 12 of the touch pad 10. The downward movement detection part 14 may be formed by a tact switch, a pressure sensing sensor (piezoelectric elements), etc. The downward movement detection part 14 may be disposed at any place as long as the down movement of the operation surface of the coordinate detection part 12 causes the downward movement detection part 14 to come in contact with the coordinate detection part 12 or the outer frame element 50. For example, in the example illustrated in FIG. 3, the pressure sensing sensor forming the downward movement detection part 14 is provided below a center portion of the coordinate detection part 12; however, the pressure sensing sensor may be provided around the coordinate detection part 12 (i.e., below the outer frame element 50). Further, a plurality of the pressure sensing sensors forming the downward movement detection part 14 may be provided at different places.

The control part 16 and the memory 18 are formed by a microcomputer, for example. The control part 16 and the memory 18 may be installed on the substrate 60. The respective functions of the control part 16 (including functions described hereinafter) may be implemented by any hardware, any software, any firmware or any combination thereof. For example, any part of or all the functions of the processing device 16 may be implemented by an ASIC (application-specific integrated circuit), a FPGA (Field Programmable Gate Array) or a DSP (digital signal processor). Further, the functions of the control part 16 may be implemented by a plurality of computers in cooperation.

The control part 16 detects, based on an output (output signal) from the electrostatic capacitance type sensor of the coordinate detection part 12, a touch of a finger on the touch operation surface. At that time, the control part 16 generates a coordinate signal representing coordinates of a position in the touch operation surface, that is to say, the coordinates of the position (contact position of the operating finger) at which the touch operation is performed by the operator. It is noted that, in the case where the coordinate detection part 12 is formed by the electrostatic capacitance type pad, the charge of the condenser formed by the operating finger is accumulated as described above, and the change amounts of the charges at the respective electrodes differ according to the position of the operating finger. Thus, the position of the operating finger can be identified based on the detection signals from the respective electrodes. Specifically, when the output level from the coordinate detection part 12 exceeds a predetermined reference value (detection threshold), the control part 16 detects the touch of the finger on the touch operation surface and generates the coordinate signal based on the position of the electrode whose level of the detection signal is maximum (local maximum). The predetermined reference value may be related to a change amount of the charge accumulated in the electrode, for example. For example, when the change amount (maximum change amount) of the charge accumulated in any electrodes exceeds the reference value, the control part 16 determines that the selection operation is performed by the operator to generate the coordinate signal (representing the two-dimensional position at which the change amount of the charge is maximum), while the control part 16 determines that there is no contact of the finger with the touch operation surface and does not generate the coordinate signal when the change amount of the charge accumulated in any electrodes does not exceed the reference value. It is noted that the reference value may be stored in the memory 18. The coordinate signal thus generated is transmitted to the display control apparatus 30.

The control part 16 generates an enter signal based on an output signal from the downward movement detection part 14. For example, in the case where the downward movement detection part 14 is formed by the pressure sensing sensor, the control part 16 generates the enter signal when an output (pressing down pressure) from the pressure sensing sensor exceeds a predetermined threshold Pn. In the case where the downward movement detection part 14 is formed by the tact switch, the control part 16 generates the enter signal when an ON signal is input from the tact switch. The enter signal thus generated is transmitted to the display control apparatus 30. It is noted that, in the case where a plurality of the pressure sensing sensors forming the downward movement detection part 14 are provided, the control part 16 may generate the enter signal when the output from any one of the pressure sensing sensors exceeds a predetermined threshold Pn. In this case, the pressure sensing sensors are provided not for the sake of detecting the pressed down location on the touch pad 10 (typically, the electrostatic capacitance type pad forming the coordinate detection part 12) but for the sake of determining whether the pressing down operation on the touch pad 10 is performed. Thus, the enter signal represents only the occurrence of an event that the outer frame element 50 and the coordinate detection part 12 move in the down direction, and may not include other information such as information about the position of the pressed down location (information representing which of the outer frame element 50 and the coordinate detection part 12 is pressed down). Similarly, in the case where a plurality of the tact switches forming the downward movement detection part 14 are provided, the control part 16 may the enter signal when the ON signal from any one of the tact switches is input. The enter signal thus generated is transmitted to the display control apparatus 30.

It is noted that, according to the embodiment, as described above, the outer frame element 50 is provided. Thus, even when the same enter signal is transmitted, there are two cases, that is to say, a first case where the enter signal is transmitted with the coordinate signal being transmitted, and a second case where the enter signal is transmitted without the coordinate signal being transmitted. In other words, when the operator presses down the touch pad 10 with his/her finger to cause it to move in the down direction, the enter signal and the coordinate signal are generated; however, only the enter signal is generated and the coordinate signal is not generated when the operator presses down only the outer frame element 50 with his/her finger to cause it to move in the down direction without touching the touch pad 10 (i.e., without the detection threshold for the touch of the finger being exceeded).

The control part 16 communicates with the display control apparatus 30 to transmit various items of information (the coordinate signal, the enter signal, a message output demand, etc.) to the display control apparatus 30. It is noted that a part or all of the functions of the control part 16 may be implemented by the coordinate detection part 12.

The display 20 is disposed remotely with respect to the touch pad 10. The display 20 may be an arbitrary display device such as a liquid crystal display and a HUD (Head-Up Display). The display 20 may be placed at an appropriate location in the vehicle (in an instrument panel, for example). The display 20 may be of a touch panel type or of a type for which the touch operation cannot be performed. An operation image area (see FIG. 4) representing an operation content that can be operated with the touch pad 10 is displayed on the display 20. It is noted that, at a background of the operation image area, or during the time the operation image area is not being displayed, an image of a TV, a surrounding circumstance monitoring camera, etc., may be displayed on the display 20.

The operation image area may be displayed over an overall image area as illustrated in FIG. 4, or may be displayed at a part of the overall image area. The operation image area may include two or more selection target items that can be operated with the touch pad 10, as illustrated in FIG. 4. The operation image area may include other information display portions (a portion for displaying a TV, a state of an audio apparatus, an outside temperature, travel information such as gas mileage, entertainment information, etc.). It is noted that, in the example illustrated in FIG. 4, the operation image area is used for the various operations for a radio with the touch pad 10.

The selection target items form imaginary operation buttons (which means that the selection target items are not buttons of mechanical type that are directly operated by the hand). The selection target items (operation buttons) may be related to any types (functions). In other words, the contents operable with the touch pad 10 may be arbitrary. For example, the selection target items may be operated for requesting (calling) an image area for various settings for a navigation apparatus or a map image area (including a display of the current position, for example) to be displayed on the display 20. Further, the selection target items may be operated for various settings for an air conditioner, or for requesting its operation image area to be displayed on the display 20. Further, the selection target items may be operated for various settings (a volume adjustment, etc.) for an audio apparatus or a TV, or for requesting its operation image area to be displayed on the display 20. Further, the selection target items may include icons, launchers, etc., for starting up any application. Further, the selection target items may include text input buttons in the operation image area such as an operation image area for inputting the Japanese syllabary, etc.

Further, the selection target items may include respective lists 71a through 71f to be scrolled in a list display area 90 (i.e., a list image area), as illustrated in FIG. 4. The number of the lists 71a through 71f, the contents thereof, the display manner thereof, etc., may be arbitrary. Further, a way of scrolling the lists may be arbitrary. For example, the lists may be scrolled in an endless manner as if the lists were on a drum (a rotating body), or may be scrolled such that scrolling is stopped at the ends thereof. In the example illustrated in FIG. 4, the lists 71a through 71f are selection target items for setting a frequency for the radio and represents the respective frequencies that can be set. Further, the selection target items may include a button for scrolling 72 that is to be operated for scrolling the lists. The button for scrolling 72 includes a button 72a for the list scroll in the upward direction and a button 72b for the list scroll in the downward direction.

States of the selection target items each are changed from an ordinary displayed state to a selected state or from the selected state to the ordinary displayed state based on the coordinate signal from the touch pad 10 under the control of the display control apparatus 30 as described hereinafter. In the example illustrated in FIG. 4, a cursor 80 that can be moved with the operations on the touch pad 10 is displayed on the display 20. The cursor 80 is on the selection target item "SAT" related to satellite broadcasting, for example, and thus the selection target item "SAT" is displayed in the selected state. It is noted that the cursor 80 herein represents the selection target item itself that is displayed in the selected state. Thus, the position of the cursor 80 corresponds to the position of the selection target item displayed in the selected state.

Similar to the control part 16, the display control apparatus 30 is formed by a microcomputer, for example, and may be embodied as an ECU. It is noted that a connection manner between the display control apparatus 30 and the touch pad 10 is arbitrary, including a wired connection, a wireless connection or a combination thereof, and the display control apparatus 30 and the touch pad 10 may be connected directly or indirectly. Further, a part or all of the functions of the display control apparatus 30 may be implemented by the control part 16 of the touch pad 10 or a control part (not illustrated) of the display 20. Conversely, a part or all of the functions of the control part 16 of the touch pad 10 may be implemented by the display control apparatus 30.

Vehicle speed information representing vehicle speed, power source information related to a state (IG, ACC) of an electric power source of the vehicle, etc., may be input to the display control apparatus 30, if necessary.

The display control apparatus 30 is connected to a controller 40. The controller 40 controls devices to be operated with the operation apparatus for vehicle 1. For example, the controller 40 may include an audio controller that controls the audio apparatus, a navigation controller that controls the navigation apparatus, a controller that controls the air conditioner, etc. It is noted that the display control apparatus 30 may implement a part or all of the functions of the controller 40.

The display control apparatus 30 coordinates the display 20 with the touch pad 10 to assist the operations on the touch pad 10. Specifically, the display control apparatus 30 causes the display 20 to display the operation image area (see FIG. 4), and performs a selection process, an enter process, etc., of the selection target items based on the signals (the coordinate signal and the enter signal) from the touch pad 10.

More specifically, when the display control apparatus 30 receives the coordinate signal from the touch pad 10 as described above, the display control apparatus 30 causes one of the selection target items in the operation image area to be displayed in the selected state (i.e., the display control apparatus 30 responds to "a selection operation". In other words, the display control apparatus 30 determines the position of the cursor 80. At that time, the display control apparatus 30 may operate in an absolute coordinate mode. According to the absolute coordinate mode, a coordinate system of the image area of the display 20 corresponds to a coordinate system of the operation surface of the touch pad 10 in a fixed manner. According to the absolute coordinate mode, typically, the coordinate system of the image area of the display 20 is associated with the coordinate system of the operation surface of the touch pad 10 in such a fixed manner that an original point of the coordinate system of the image area of the display 20 is located at a fixed position and an original point of the coordinate system of the operation surface of the touch pad 10 is located at a fixed position. In the example illustrated in FIG. 5, the coordinate system of the image area of the display 20 in which the original point thereof is fixed at a left and bottom corner of the image area of the display 20 is associated with the coordinate system of the operation surface of the touch pad 10 in which the original point thereof is fixed at a left and bottom corner of the operation surface of the touch pad 10. It is noted that, in general, a size of the overall image area of the display 20 is not equal to a size of the operation surface of the touch pad 10, and thus the relationship between the respective coordinate systems may be proportional according to the ratio of the size therebetween.

It is noted that, in an initial state of the operation image area, any one of the selection target items may be displayed in the selected state as a default, or none may be displayed in the selected state. It is noted that a way of implementing the selected state (i.e., the image of the cursor 80) may be arbitrary as long as the operator can recognize that the selection target item displayed in the selected state is selected. For example, the selected state may be implemented by making luminance, color, etc., of the selection target item to be displayed in the selected state different from that of other selection target items, or featuring a boundary of the selection target item to be displayed in the selected state with respect to that of other selection target items.

Once the display control apparatus 30 causes, in response to the coordinate signal from the touch pad 10, a certain one selection target item to be displayed in the selected state (i.e., causes the cursor 80 to be displayed), the display control apparatus 30 may keep the selection target item being displayed in the selected state even if the coordinate signal from the touch pad 10 is not input afterward. This is because there is a probability that, even after the finger has been away from the touch pad 10, the continuation of the operation may be performed. In this case, the selected state of the selection target item may be maintained until another selection target item is selected in response to the coordinate signal from the touch pad 10 afterward (or until the image area is switched to another image area, or the image area is turned off). Alternatively, the selected state of the selection target item may be maintained until a relatively long period lapses after no coordinate signal is input from the touch pad 10.

Further, when the display control apparatus 30 receives the enter signal from the touch pad 10, the display control apparatus 30 implements the operation content of the selection target item displayed in the selected state at that time (i.e., the display control apparatus 30 implements an enter function in response to "an enter operation"). It is noted that the operation content depends on the selection target item related to the enter operation, and may involve a transition of the image area such as displaying a hierarchically lower selection target items, changing the operation image area, etc., inputting the text, launching the application, transmitting the control signal to the controller 40, etc. Further, at the time of detecting the enter operation, the display of the selection target item entered may be changed appropriately or a predetermined sound may be generated so as to inform the user of the acceptance of the "enter operation".

Here, according to the embodiment, as described above, since the outer frame element 50 is provided, there are two cases, that is to say, a first case where the enter signal from the touch pad 10 is received with the reception of the coordinate signal from the touch pad 10, and a second case where only the enter signal from the touch pad 10 is received without the reception of the coordinate signal from the touch pad 10. In other words, even when the display control apparatus 30 receives the same enter signal, there are one case where the display control apparatus 30 receives the coordinate signal simultaneously and the other case where the display control apparatus 30 does not receive the coordinate signal simultaneously.

In this case, when the display control apparatus 30 receives the enter signal from the touch pad 10 with the reception of the coordinate signal, the display control apparatus 30 may respond to the enter operation described above. On the other hand, when the display control apparatus 30 receives the enter signal from the touch pad 10 without the reception of the coordinate signal, the display control apparatus 30 may not respond to the enter operation described above but implement functions described hereinafter. Alternatively, when the display control apparatus 30 receives the enter signal from the touch pad 10 without the reception of the coordinate signal, there may be two cases, that is to say, a first case where the display control apparatus 30 responds to the enter operation described above under a predetermined condition, and a second case where the display control apparatus 30 does not respond to the enter operation described above but implement functions described hereinafter.

In the following, at first, a case is assumed where the display control apparatus 30 does not respond to the enter operation described above at all when the display control apparatus 30 receives the enter signal from the touch pad 10 without the reception of the coordinate signal. According to such a configuration, the enter function is not implemented by the operation pressing down only the outer frame element 50. Thus, in the following, such a configuration is also referred to as "a configuration in which the enter operation with the outer frame element 50 is not possible".

According to the configuration in which the enter operation with the outer frame element 50 is not possible, when the display control apparatus 30 receives the enter signal from the touch pad 10 without the reception of the coordinate signal, the display control apparatus 30 may implement a predetermined function (different from the enter function) according to the operation image area that is currently displayed. For example, if the selection target items in the currently displayed operation image area include the lists to be scrolled, the display control apparatus 30 may implement the list scroll (i.e., a list scroll function), regardless of the presence or absence of the cursor 80 (i.e., the display control apparatus 30 responds to "a list scroll operation"). Further, if the currently displayed operation image area is the map image area, the display control apparatus 30 may scroll the map image area itself (i.e., the display control apparatus 30 responds to "a map scroll operation"). Further, in the case of a plurality of pages of the operation image areas (the operation image areas with a hierarchical structure, for example), the display control apparatus 30 may successively change the page of the operation image area (i.e., a list scroll function), regardless of the presence or absence of the cursor 80 (i.e., the display control apparatus 30 responds to "an image area changing (page turning) operation"). Further, in the case of the operation image areas for displaying an electronic book, the display control apparatus 30 may successively change the page image area of the book (i.e., the display control apparatus 30 responds to "an image area changing (page turning) operation"). Further, in the case of the operation image areas for displaying WEB sites, for example, the display control apparatus 30 may successively change the image area such as so-called Back (Return)/Forward functions (i.e., the display control apparatus 30 responds to "an image area changing operation"). Further, the display control apparatus 30 may successively move the cursor 80 from the selection target item to another selection target item in the operation image area according to a predetermined rule (i.e., the display control apparatus 30 responds to "a cursor successively moving operation"). This successive movement of the cursor 80 may be implemented in only the currently displayed operation image area, or may involve change of the operation image area. It is noted that these functions may be continuously implemented during the reception of the enter signal from the touch pad 10 without the reception of the coordinate signal (i.e., during the time the outer frame element 50 is being pressed down). The display control apparatus 30 stops scrolling, etc., when the reception of the enter signal from the touch pad 10 is terminated.

Next, a case is assumed where the display control apparatus 30 selectively responds to the enter operation or implements another function upon the display control apparatus 30 receiving the enter signal from the touch pad 10 without the reception of the coordinate signal. According to such a configuration, the enter function may be implemented by the operation pressing down only the outer frame element 50. Thus, in the following, such a configuration is also referred to as "a configuration in which the enter operation with the outer frame element 50 is possible".

According to the configuration in which the enter operation with the outer frame element 50 is possible, when the display control apparatus 30 receives the enter signal from the touch pad 10 without the reception of the coordinate signal, the display control apparatus 30 scrolls the lists in the operation image area (i.e., the display control apparatus 30 responds to "the list scroll operation") upon a predetermined list scroll condition being met. The predetermined list scroll condition may include a condition where the selection target items of the currently displayed operation image area include lists, for example. Alternatively, the predetermined list scroll condition may include a condition where the selection target items of the currently displayed operation image area include lists and the cursor 80 is located in the list display area 90 (see FIG. 4), for example. Alternatively, the predetermined list scroll condition may include a condition where the selection target items of the currently displayed operation image area include lists and the cursor 80 is not on any selection target item or there is no cursor 80 displayed, for example. It is noted that the list display area 90 may be an area that does not include the button for scrolling 72. On the other hand, when the cursor 80 is on the selection target item (i.e., the selection target item is in the selected state) under a situation where the predetermined list scroll condition is not met, the display control apparatus 30 may implement the function of the selection target item in the selected state (i.e., respond to the enter operation).

Further, according to the configuration in which the enter operation with the outer frame element 50 is possible, when the display control apparatus 30 receives the enter signal from the touch pad 10 without the reception of the coordinate signal, the display control apparatus 30 scrolls the map image area itself (i.e., the display control apparatus 30 responds to the "map scroll operation") upon a predetermined map scroll condition being met. The predetermined map scroll condition may include a condition where the currently displayed operation image area includes the map image area, for example. Alternatively, the predetermined list scroll condition may include a condition where the currently displayed operation image area includes the map image area and there is no cursor 80 or pointer displayed on the map image area. In the latter case, the display control apparatus 30 may respond to the enter operation when the cursor 80 or the pointer is located on the map image area under a situation where the predetermined map scroll condition is not met.

Further, according to the configuration in which the enter operation with the outer frame element 50 is possible, when the display control apparatus 30 receives the enter signal from the touch pad 10 without the reception of the coordinate signal, the display control apparatus 30 changes the image area (i.e., the display control apparatus 30 responds to the "image area changing operation") upon a predetermined image area changing condition being met. Changing the image area includes changing the operation image area and changing the WEB image area, as described above. The predetermined image area changing condition may include a condition where the cursor 80 or the pointer is not displayed, for example. On the other hand, the display control apparatus 30 may respond to the enter operation when the cursor 80 or the pointer is located on the image area under a condition where the predetermined image area changing condition is not met.

Further, according to the configuration in which the enter operation with the outer frame element 50 is possible, when the display control apparatus 30 receives the enter signal from the touch pad 10 without the reception of the coordinate signal, the display control apparatus 30 implements the successive movement of the cursor 80 (i.e., the display control apparatus 30 responds to the cursor successively moving operation") upon a predetermined cursor successive movement condition being met. The predetermined cursor successive movement condition may include a condition where the cursor 80 is not displayed, for example. On the other hand, when the cursor 80 is on the selection target item (i.e., the selection target item is in the selected state) under a condition where the predetermined cursor successive movement condition is not met, the display control apparatus 30 may implement the function of the selection target item in the selected state (i.e., respond to the enter operation).

It is noted that, in the configuration in which the enter operation with the outer frame element 50 is not possible or the configuration in which the enter operation with the outer frame element 50 is possible, only one, only two or only three of scrolling the lists, scrolling the map image area, changing the image area, and successively moving the cursor 80 may be implemented. Alternatively, all of scrolling the lists, scrolling the map image area, changing the image area, and successively moving the cursor 80 may be implemented. Further, if the conditions related to the respective operations are overlapped, any one operation (with higher priority that is given in advance) may be implemented. For example, in the case of the configuration in which the enter operation with the outer frame element 50 is possible, if the predetermined list scroll condition and the predetermined cursor successive movement condition are simultaneously met, scrolling the lists may be implemented. Further, in the case of the configuration in which the enter operation with the outer frame element 50 is not possible, scrolling the lists may be implemented with higher priority over the image area changing operation and the cursor successively moving operation, for example.

Figure 6:
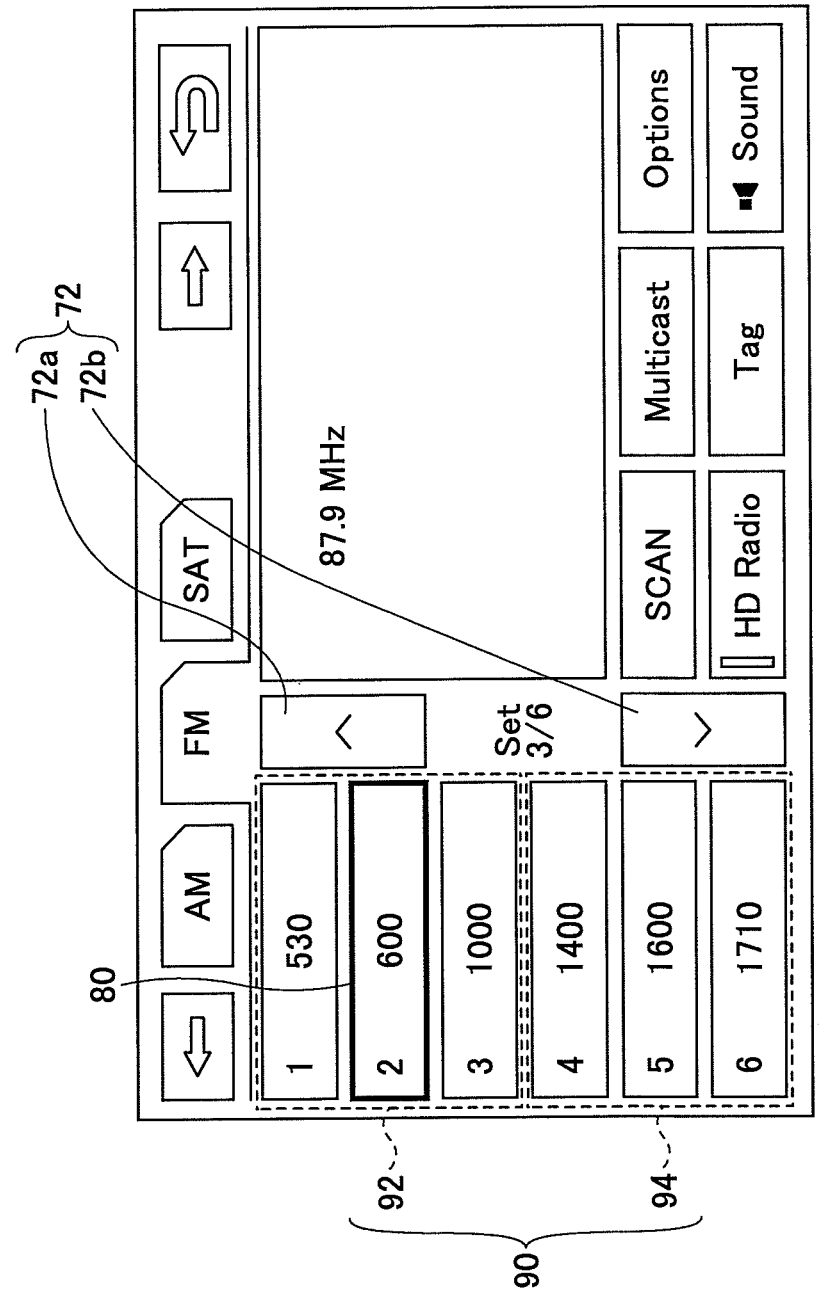
FIG. 6 is a diagram for explaining an example of a way of determining a scroll direction at a time of scrolling lists.

Next, with reference to FIG. 6, a scroll direction when the list scroll operation is explained.

FIG. 6 is a diagram for explaining an example of a way of determining the scroll direction at the time of scrolling lists. FIG. 6 illustrates an example of the operation image area.

In the example illustrated in FIG. 6, the list display area 90 is imaginarily divided into an upper list display area 92 and a lower list display area 94. In the configuration in which the enter operation with the outer frame element 50 is possible, when the display control apparatus 30 receives the enter signal from the touch pad 10 without the reception of the coordinate signal, the display control apparatus 30 scrolls the lists if the cursor 80 is located in the list display area 90, for example. At that time, the display control apparatus 30 may scroll the lists in an upward direction when the cursor 80 is located in the upper list display area 92, while display control apparatus 30 may scroll the lists in a downward direction when the cursor 80 is located in the lower list display area 94. It is noted that, in the example illustrated in FIG. 6, since the cursor 80 is located in the upper list display area 92, the lists are scrolled in the upward direction when the outer frame element 50 is pressed down.

Thus, for the operator who desires to scroll the lists in the list display area 90 in the upward direction, the operator may operate on the touch operation surface to move the cursor 80 to the upper list display area 92, at first, and then press down the outer frame element 50. It is noted that the operator who desires to scroll the lists in the list display area 90 in the upward direction, the operator may also operate on the touch operation surface to move the cursor 80 to a button for an upward scroll 72a, at first, and then press down the touch operation surface. However, in this case, since the button for an upward scroll 72a is smaller than the upper list display area 92, the operation for moving the cursor 80 is relatively difficult. It is noted that, in the embodiment, as described above, since the scroll operation with the outer frame element 50 is possible, the button for scrolling 72 can be omitted.

It is noted that, even in the configuration in which the enter operation with the outer frame element 50 is not possible, the display control apparatus 30 may determine, according to the position of the cursor 80 in the operation image area, the scroll direction at the time of scrolling the lists. For example, the display control apparatus 30 may scroll the lists in the upward direction in response to the reception of the enter signal without the reception of the coordinate signal when the cursor 80 is located in the upper half of the operation image area, while the display control apparatus 30 may scroll the lists in the downward direction in response to the reception of the enter signal without the reception of the coordinate signal when the cursor 80 is located in the lower half of the operation image area.

It is noted that, in the example illustrated in FIG. 6, the upward and downward list scrolls are explained; however, it holds true for leftward and rightward list scrolls. For example, in the case of the configuration in which the enter operation with the outer frame element 50 is possible, the list display area is imaginarily divided into left and right portions, and the scroll direction may be determined according to whether the cursor 80 is located in the left portion or the right portion. Even in the case of the configuration in which the enter operation with the outer frame element 50 is not possible, the display control apparatus 50 may scroll the lists in the leftward direction in response to the reception of the enter signal without the reception of the coordinate signal when the cursor 80 is located in the left half of the operation image area, while the display control apparatus 30 may scroll the lists in the rightward direction in response to the reception of the enter signal without the reception of the coordinate signal when the cursor 80 is located in the right half of the operation image area.

Figure 7:
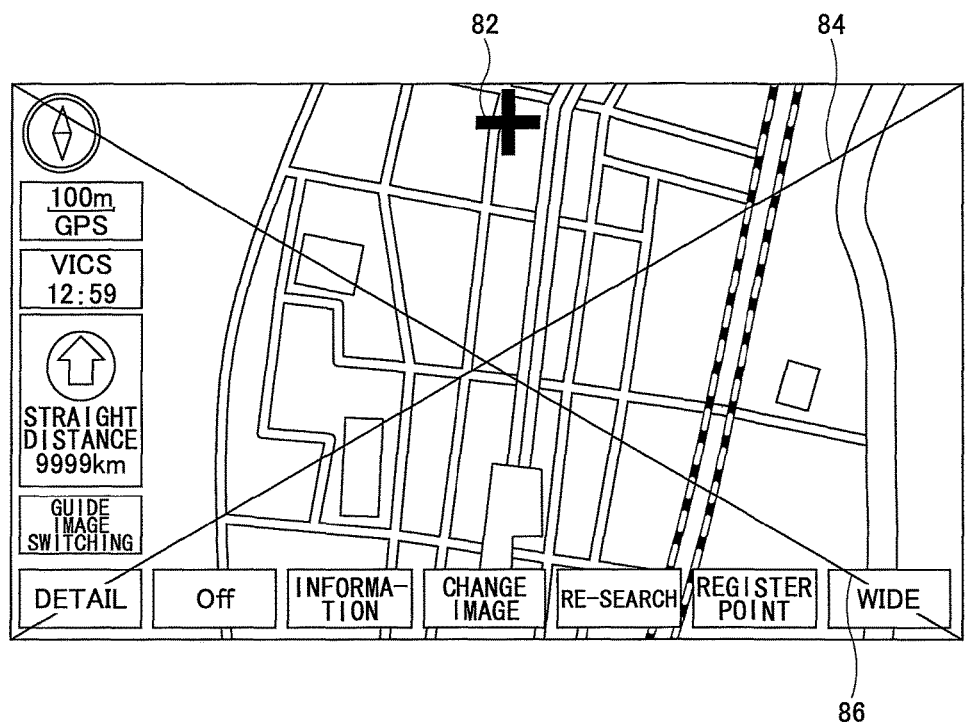
FIG. 7 is a diagram for explaining an example of a way of determining a scroll direction at a time of scrolling a map.

FIG. 7 is a diagram for explaining an example of a way of determining the scroll direction at the time of scrolling a map. FIG. 7 illustrates an example of the operation image area including the map image area.

In the example illustrated in FIG. 7, the operation image area is imaginarily divided into four areas (an upper area, a lower area, a right area, and left area) by two imaginary lines 84 and 86 that extend toward the corners of the image area and intersect at the center of the image area. In the configuration in which the enter operation with the outer frame element 50 is possible, when the display control apparatus 30 receives the enter signal from the touch pad 10 without the reception of the coordinate signal, the display control apparatus 30 scrolls the map if the pointer 82 is located in the map image area and the cursor 80 is not displayed, for example. In this case, the display control apparatus 30 may scroll the map image area in the upward direction when the pointer 82 is located in the upper area, scroll the map image area in the downward direction when the pointer 82 is located in the lower area, scroll the map image area in the rightward direction when the pointer 82 is located in the right area, and scroll the map image area in the leftward direction when the pointer 82 is located in the left area. It is noted that, even in the configuration in which the enter operation with the outer frame element 50 is not possible, the display control apparatus 30 may determine, according to the position of the pointer 82 in the operation image area, the scroll direction at the time of scrolling the map. Thus, for the operator who desires to scroll the map image area in the upward direction, the operator may operate on the touch operation surface to move the pointer 82 to the upper area, at first, and then press down the outer frame element 50.

It is noted that in the example illustrated in FIG. 7, the overall operation image area is imaginarily divided into the four areas; however, only the map image area in the operation image area may be imaginarily divided into the four areas. Further, the imaginary lines 84 and 86 may be displayed during the movement of the pointer 82.

Figure 8:
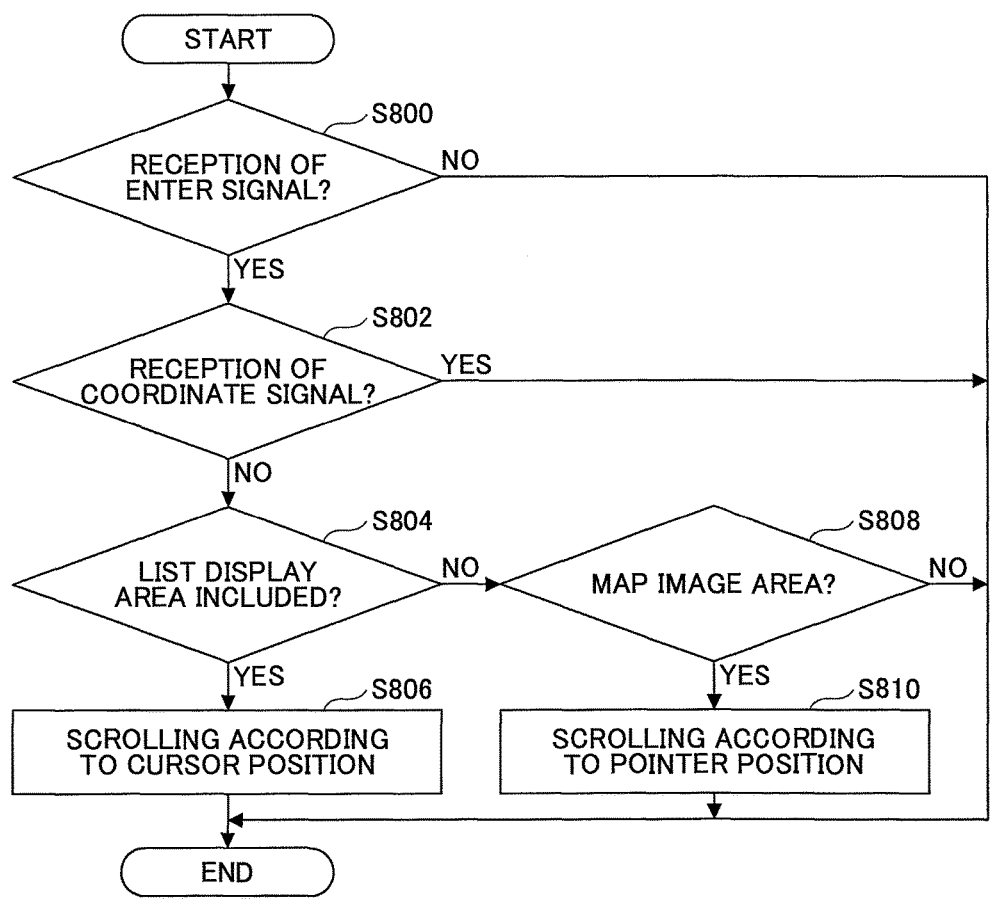
FIG. 8 is an example of a flowchart of a process executed by a display control apparatus 30.

FIG. 8 is an example of a flowchart of a process executed by the display control apparatus 30. Here, as an example, the configuration in which the enter operation with the outer frame element 50 is not possible is assumed.

In step S800, it is determined whether the enter signal is received from the touch pad 10. If it is determined that the enter signal is received from the touch pad 10, the process routine goes to step S802, otherwise ends directly.

In step S802, it is determined whether the coordinate signal is received from the touch pad 10. If it is determined that the coordinate signal is not received from the touch pad 10, the process routine goes to step S804. On the other hand, if it is determined that the coordinate signal is received from the touch pad 10, the process ends directly. It is noted that, in this case, another process routine is performed such that the selection process in response to the selection operation is performed based on the received coordinate signal.

In step S804, it is determined whether the currently displayed operation image area includes the list display area 90. If it is determined that the currently displayed operation image area includes the list display area 90, the process routine goes to step S806, otherwise the process routine goes to step S808.

In step S806, the lists in the list display area 90 are scrolled according to the position of the cursor 80. For example, the display control apparatus 30 may scroll the lists in the upward direction when the cursor 80 is located in the upper half of the operation image area, while the display control apparatus 30 may scroll the lists in the downward direction when the cursor 80 is located in the lower half of the operation image area. This scroll process may be continuously performed during the reception of the enter signal. It is noted that the way of displaying the cursor 80 during the time the lists are being scrolled may be arbitrary. For example, such a configuration may be used in which the cursor 80 may not move during the time the lists are being scrolled (only the lists are scrolled), or the cursor 80 may move to an uppermost or lowermost position according to the scroll direction during the lists being scrolled (only the lists are scrolled after the cursor 80 reaches the uppermost or lowermost position).

In step S808, it is determined whether the currently displayed image area is a map image area. It is noted that the map image area may include the selection target items therearound, as illustrated in FIG. 7. If it is determined that the currently displayed image area is a map image area, the process routine goes to step S810. On the other hand, if it is determined that the currently displayed image area is not a map image area, the process routine ends directly. It is noted, in this case, the image area changing operation or the cursor successively moving operation may be implemented according to the currently displayed image area.

In step S810, the map image area is scrolled according to the position of the pointer 82 in the map image area. For example, the display control apparatus 30 may scroll the map image area in the upward direction when the pointer 82 is located in the upper area of the map image area, scroll the map image area in the downward direction when the pointer 82 is located in the lower area of the map image area, scroll the map image area in the rightward direction when the pointer 82 is located in the right area of the map image area, and scroll the map image area in the leftward direction when the pointer 82 is located in the left area of the map image area. This scroll process may be continuously performed during the reception of the enter signal.

Figure 9:
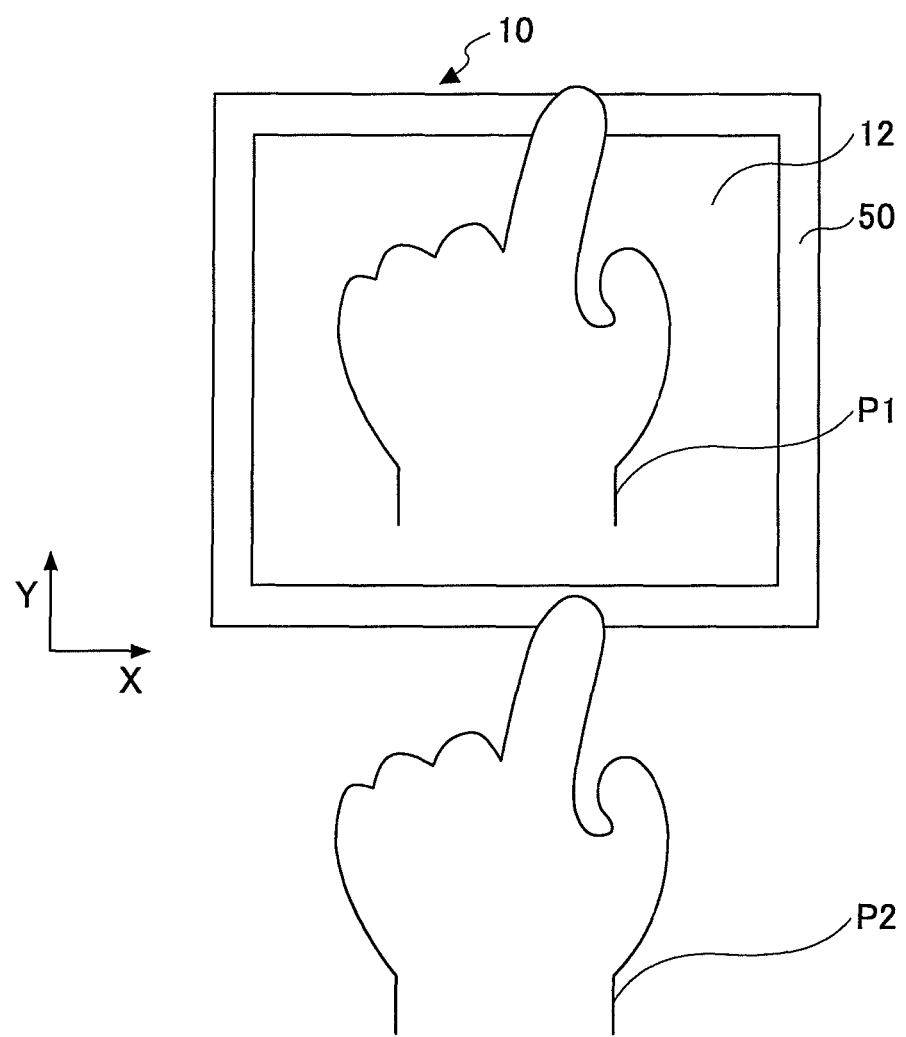
FIG. 9 is a diagram for explaining another example of a way of determining a scroll direction at a time of scrolling lists.
Figure 10:
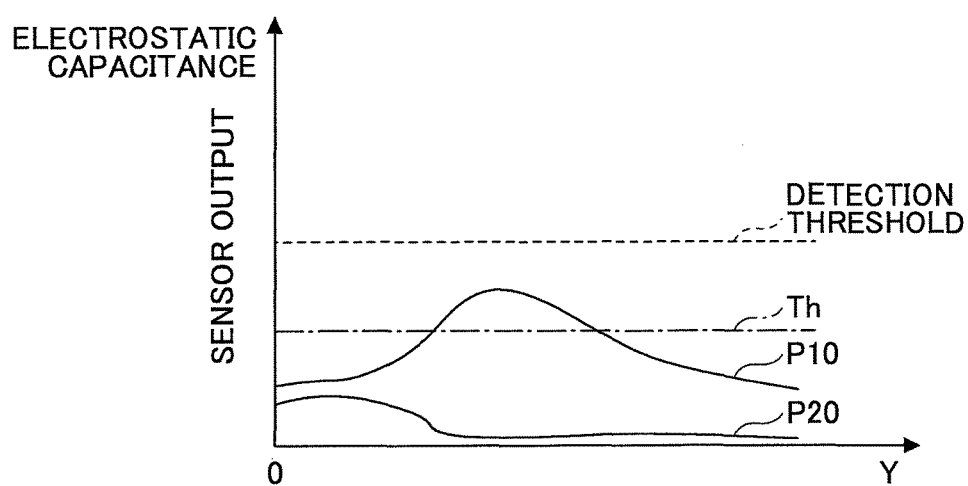
FIG. 10 is a diagram for schematically illustrating an image of an output level of an electrostatic capacitance type sensor at the time of the operation illustrated in FIG. 9.

FIG. 9 is a diagram for explaining another example of the way of determining the scroll direction at the time of scrolling the lists. FIG. 9 is a plane view that schematically illustrates a state of the hand operating on the touch operation surface. FIG. 10 is a diagram for schematically illustrating an image of the output level of the electrostatic capacitance type sensor at the time of the operation illustrated in FIG. 9. In FIG. 10, a lateral axis indicates the position of the touch operation surface in Y direction, and a vertical axis indicates the output level of the electrostatic capacitance type sensor. In FIG. 10, two curves P10 and P20 are illustrated.

In FIG. 9, the state of the hand in operating on a farther side portion of the outer frame element 50 that corresponds to the farther side of the touch operation surface is schematically illustrated by a reference symbol P1, and the state of the hand in operating on a nearer side portion of the outer frame element 50 that corresponds to the nearer side of the touch operation surface is schematically illustrated by a reference symbol P2. The overall hand covers the touch operation surface when the pressing down operation on the farther side portion of the outer frame element 50 is performed, while the hand is not located above the touch operation surface when the pressing down operation on the nearer side portion of the outer frame element 50 is performed. Thus, since such a difference causes the difference in the output level of the electrostatic capacitance type sensor, such a difference can be utilized to determine on which side of the outer frame element 50 the operation is performed. For example, in FIG. 10, as just an image, a wave shape P10 of the output level of the electrostatic capacitance type sensor when the pressing down operation on the farther side of the touch operation surface is performed is illustrated, and a wave shape P20 of the output level of the electrostatic capacitance type sensor when the pressing down operation on the nearer side of the touch operation surface is performed is illustrated. In this case, it can be determined that the pressing down operation is performed on the nearer side of the outer frame element 50 when the output level of the electrostatic capacitance type sensor is less than a setting value Th, while it can be determined that the pressing down operation is performed on the farther side of the outer frame element 50 when the output level of the electrostatic capacitance type sensor is greater than or equal to the setting value Th and less than a detection threshold related to the touch of the finger. It is noted that the setting value Th may be adapted, based on experiment data of the output signal of the electrostatic capacitance type sensor obtained when the pressing down operation is performed on the nearer side of the outer frame element 50 and the experiment data obtained when the pressing down operation is performed on the farther side of the outer frame element 50, such that these two operations can be distinguished.

Figure 11:
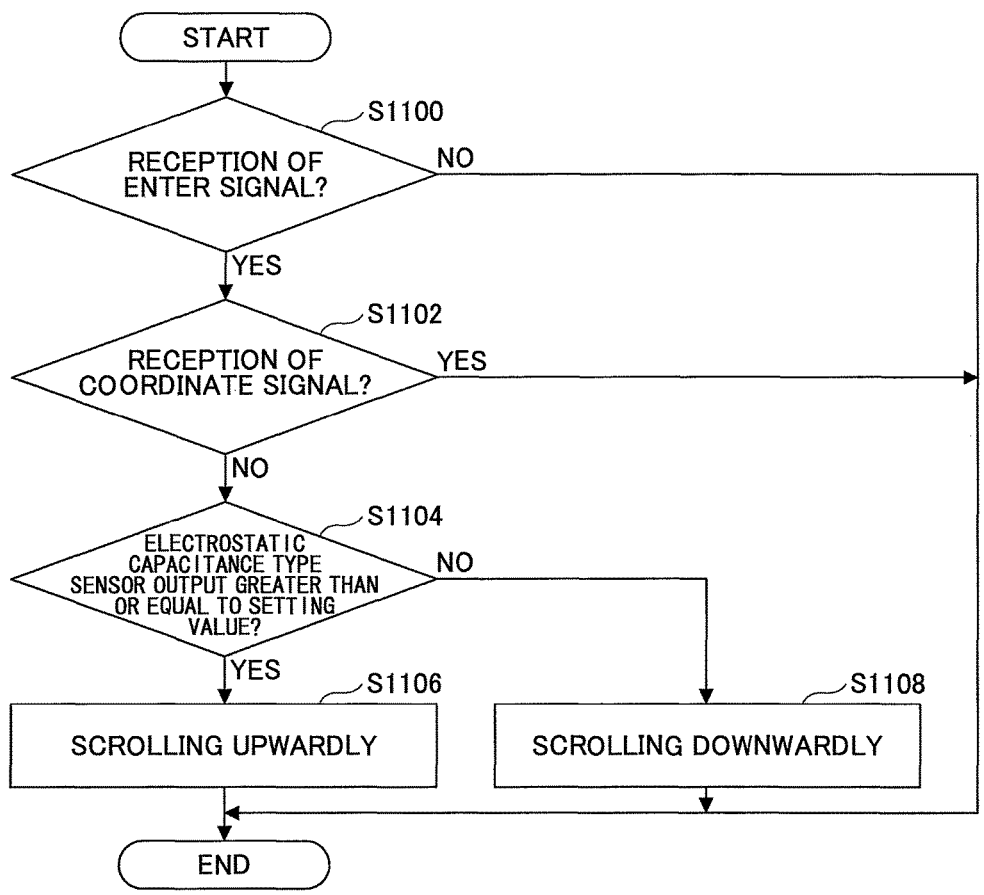
FIG. 11 is another example of a flowchart of a process executed by a display control apparatus 30.

FIG. 11 is another example of a flowchart of a process executed by a display control apparatus 30. The process illustrated in FIG. 11 may be performed instead of the process described above and illustrated in FIG. 8.

In step S1100, it is determined whether the enter signal is received from the touch pad 10. If it is determined that the enter signal is received from the touch pad 10, the process routine goes to step S1102, otherwise ends directly.

In step S1102, it is determined whether the coordinate signal is received from the touch pad 10. If it is determined that the coordinate signal is not received from the touch pad 10, the process routine goes to step S1104. On the other hand, if it is determined that the coordinate signal is received from the touch pad 10, the process ends directly. It is noted that, in this case, another process routine is performed such that the selection process in response to the selection operation is performed based on the received coordinate signal.

In step S1104, it is determined whether the output level of the electrostatic capacitance type sensor is greater than or equal to the setting value Th (see FIG. 10). If it is determined that the output level of the electrostatic capacitance type sensor is greater than or equal to the setting value Th, the process routine goes to step S1106, otherwise the process routine goes to step S1108. It is noted that whether the output level of the electrostatic capacitance type sensor is greater than or equal to the setting value Th may be determined by the control part 16, and information representing the determination result thereof may be transmitted to the display control apparatus 30. For example, the enter signal may have a plurality of types. Specifically, there are a first enter signal that is generated together with the coordinate signal, and a second enter signal that is generated without the generation of the coordinate signal. Further, the second enter signal includes a first signal generated in the case where the output level of the electrostatic capacitance type sensor is greater than or equal to the setting value Th and less than the detection threshold related to the touch of the finger, and a second signal generated in the case where the output level of the electrostatic capacitance type sensor is less than the setting value Th. In this case, if the display control apparatus 30 receives the first signal, the process routine may go to step S1106, and if the display control apparatus 30 receives the second signal, the process routine may go to step S1108.

Figure 12:
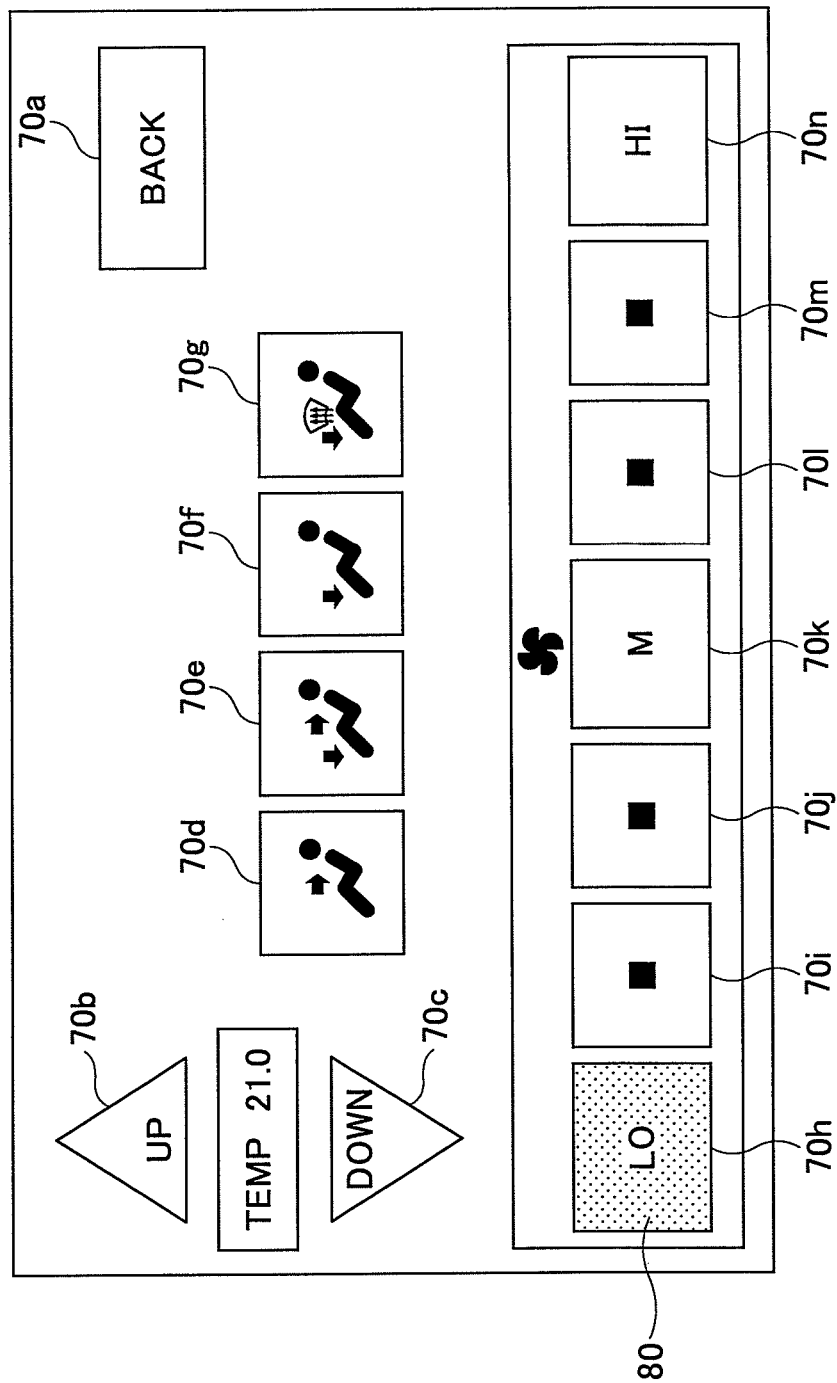
FIG. 12 is a diagram for illustrating an example of a cursor successive movement manner.

In step 1106, the controller 15 performs the scroll process in the upward direction. It is noted that the target to be scrolled may differ according to the currently displayed image area. For example, when the currently displayed image area is the operation image area including the list display area 90, the lists in the list display area 90 may be scrolled in the upward direction. Further, when the currently displayed image area is the map image area, the map image area may be scrolled in the upward direction. Alternatively, when the currently displayed image area is the operation image area that does not include the list display area 90, the cursor 80 may be moved successively in the upward direction. For example, in the example illustrated in FIG. 12, the cursor 80 may be moved successively from one of the selection target items 70*a* through 70*n* to another in alphabetic order toward letter "a" added after the numeral "70". Specifically, the cursor 80 that is currently on the selection target item 70*h* may be moved successively to the selection target items 70*g*, 70*f*, 70*e*, 70*d*, 70*c*, 70*b* and 70*a* in this order. It is noted that when the cursor 80 is moved to the selection target item 70*a*, the cursor 80 may be stopped, or moved to the selection target item 70*n* and further moved successively and upwardly again. Alternatively, if the currently displayed image area is a WEB image area, the WEB image (page) may be changed successively in a "Back" direction.

In step 1108, the controller 15 performs the scroll process in the downward direction. It is noted that the target to be scrolled may differ according to the currently displayed image area. For example, when the currently displayed image area is the operation image area including the list display area 90, the lists in the list display area 90 may be scrolled in the downward direction. Further, when the currently displayed image area is the map image area, the map image area may be scrolled in the downward direction. Alternatively, when the currently displayed image area is the operation image area that does not include the list display area 90, the cursor 80 may be moved successively in the downward direction. For example, in the example illustrated in FIG. 12, the cursor 80 may be moved successively from one of the selection target items 70*a* through 70*n* to another in alphabetic order toward letter "n" added after the numeral "70". Specifically, the cursor 80 that is currently on the selection target item 70*h* may be moved successively to the selection target items 70*i*, 70*j*, 70*e*, 70*k*, 70*k*, 70*n* and 70*n* in this order. It is noted that when the cursor 80 is moved to the selection target item 70*n*, the cursor 80 may be stopped, or moved to the selection target item 70*a* and further moved successively and downwardly again. Alternatively, if the currently displayed image area is the WEB image area, the WEB image (page) may be changed successively in a "Forward" direction.

It is noted that, in the example illustrated in FIG. 8 through FIG. 11, the pressing down operation on the nearer side portion of the outer frame element 50 and the pressing down operation on the farther side portion of the outer frame element 50 are distinguished and the scroll direction is varied according to the distinction result; however, in addition to or instead of it, the pressing down operation on the left side portion of the outer frame element 50 and the pressing down operation on the right side portion of the outer frame element 50 may be distinguished and the scroll direction may be varied according to the distinction result. For example, as is the case with the upward and downward scroll, the scroll process in the leftward direction may be performed upon the pressing down operation on the left side portion of the outer frame element 50, and the scroll process in the rightward direction may be performed upon the pressing down operation on the right side portion of the outer frame element 50. Further, as is the case with the upward and downward scroll, the successive movement of the cursor 80 in the leftward direction (that may involve the successive movement of the cursor 80 in the upward direction) may be performed upon the pressing down operation on the left side portion of the outer frame element 50, and the successive movement of the cursor 80 in the rightward direction (that may involve the successive movement of the cursor 80 in the downward direction) may be performed upon the pressing down operation on the right side portion of the outer frame element 50. Further, the successive change of the WEB image area in the "Back" direction may be performed upon the pressing down operation on the left side portion of the outer frame element 50, and the successive change of the WEB image area in the "Forward" direction may be performed upon the pressing down operation on the right side portion of the outer frame element 50.

Figure 13:
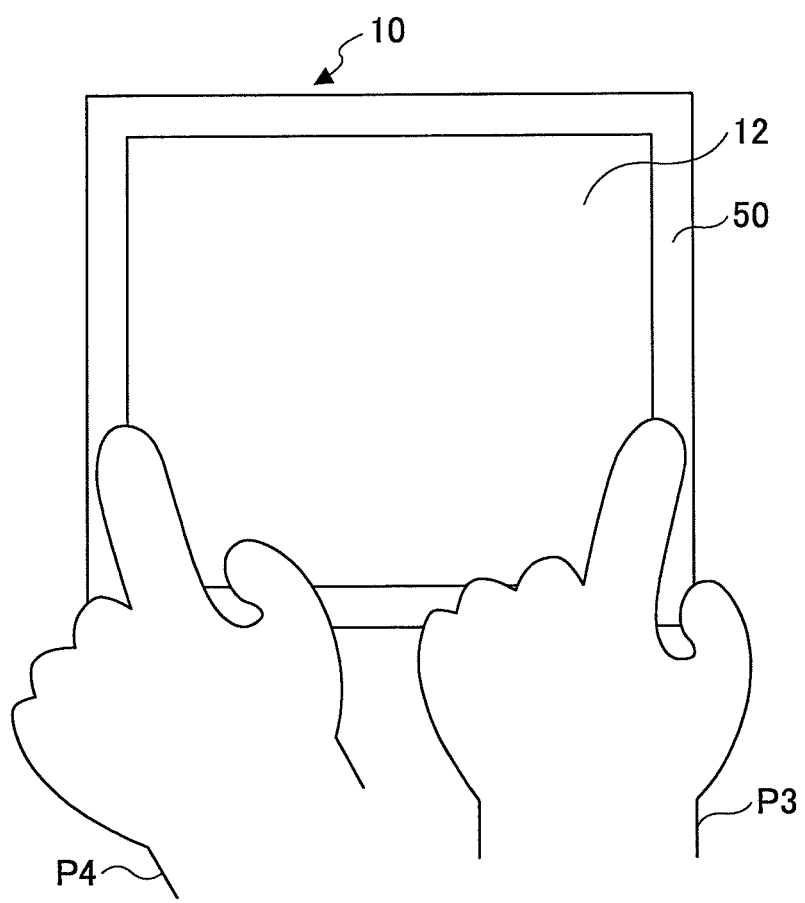
FIG. 13 is a diagram for schematically illustrating an example of a state of a hand at a time of a pressing down operation on a right side portion of an outer frame element 50, and an example of a state of the hand at a time of a pressing down operation on a left side portion of the outer frame element 50.

FIG. 13 is a diagram for schematically illustrating an example of a state of a hand at the time of the pressing down operation on the right side portion of the outer frame element 50, and an example of a state of the hand at the time of the pressing down operation on a left side portion of the outer frame element 50.

In FIG. 13, the state of the hand in operating on the right side portion of the outer frame element 50 that corresponds to the right side of the touch operation surface is schematically illustrated by a reference symbol P3, and the state of the hand in operating on the left side portion of the outer frame element 50 that corresponds to the left side of the touch operation surface is schematically illustrated by a reference symbol P4. The overall hand covers the right side region of the touch operation surface when the pressing down operation on the right side portion of the outer frame element 50 is performed, while the hand covers the left side region of the touch operation surface when the pressing down operation on the left side portion of the outer frame element 50 is performed. Thus, since such a difference causes the difference in the output level of the electrostatic capacitance type sensor, such a difference can be utilized to determine which side (left or right side) of the outer frame element 50 the operation is performed. For example, it can be determined that the pressing down operation is performed on the right side of the outer frame element 50 when the output level of the electrostatic capacitance type sensor in the right side region of the touch operation surface is greater than or equal to a setting value Th1 and less than the detection threshold related to the touch of the finger, while it can be determined that the pressing down operation is performed on the left side of the outer frame element 50 when the output level of the electrostatic capacitance type sensor in the left side region of the touch operation surface is greater than or equal to the setting value Th1 and less than a detection threshold related to the touch of the finger. It is noted that the setting value Th1 may be adapted, based on experiment data of the output signal of the electrostatic capacitance type sensor obtained when the pressing down operation is performed on the right side of the outer frame element 50 and the experiment data obtained when the pressing down operation is performed on the left side of the outer frame element 50, such that these two operations can be distinguished.

According to the operation apparatus for vehicle 1 of the embodiment described above, the following effect among others can be obtained.

As described above, according to the operation apparatus for vehicle 1, the outer frame element 50 is provided on the touch operation surface of the coordinate detection part 12, which enables distinguishing the pressing down operation on the touch operation surface from the pressing down operation on the outer frame element 50 based on the presence or absence of the coordinate signal at the time of the enter signal being generated. As a result of this, the different functions can be implemented, based on the distinction result, between the cases of the pressing down operation on the touch operation surface and the pressing down operation on the outer frame element 50, which enables saving the space while increasing the operability. Specifically, the enter operation is implemented at the time of the pressing down operation on the touch operation surface, while the list scroll, etc., can be implemented at the time of the pressing down operation on the outer frame element 50. As a result of this, it becomes unnecessary to separately provide the mechanical switch for the scroll operation, which enables saving the space. However, if necessary, the mechanical switch for the scroll operation may be provided separately. Further, according to the operation apparatus for vehicle 1, it becomes possible to omit the button for scrolling 72 in the operation image area, which enables saving the space in the operation image area. However, if necessary, the button for scrolling 72 in the operation image area may be maintained.

Figure 14:
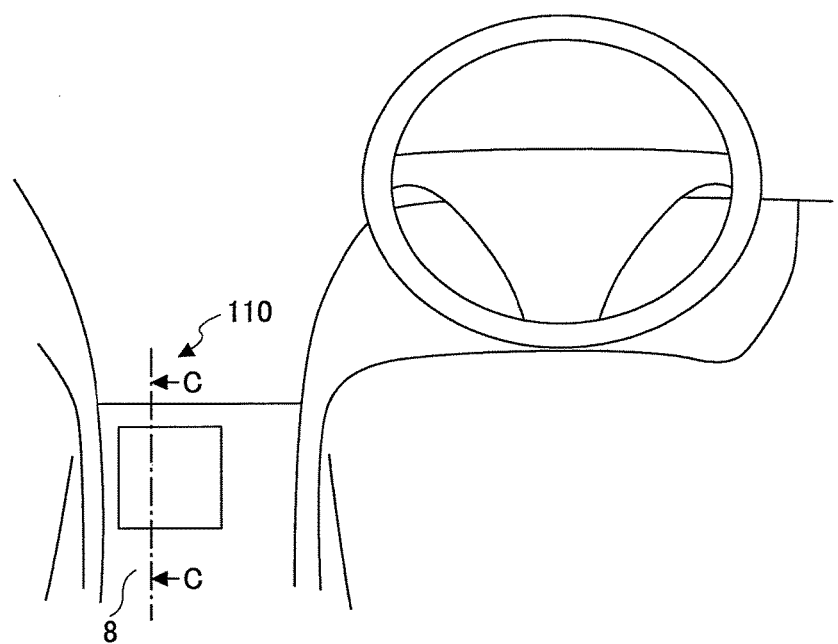
FIG. 14 is a diagram for illustrating an example of a touch pad 110 in a vehicle installed state according to another embodiment.
Figure 15:
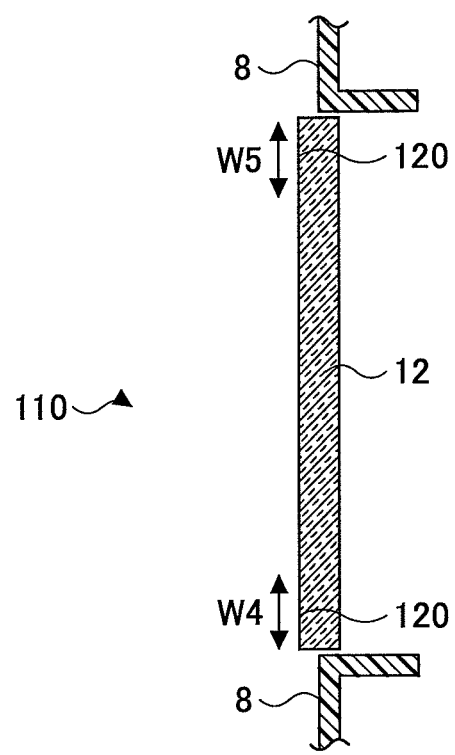
FIG. 15 is a cross-sectional view for schematically illustrating a cross section along line C-C in FIG. 14.

FIG. 14 is a diagram for illustrating an example of a touch pad 110 in a vehicle installed state according to another embodiment. FIG. 15 is a cross-sectional view for schematically illustrating a cross section along line C-C in FIG. 14. It is noted that, in FIG. 15, only a coordinate detection part 12 (touch operation surface) of the touch pad 110 is illustrated.

The touch pad 110 is provided near a console box 8; however, the touch pad 110 may be provided at any place. The touch pad 110 differs from the touch pad 10 according to the examples described above in that the touch pad 110 does not include the outer frame element 50. Instead of it, the touch pad 110 has a dead zone 120 at the outer region of the coordinate detection part 12 (touch operation surface), as illustrated in FIG. 15. The dead zone 120 is a region where the touch of the finger thereon does not cause the output signal of the electrostatic capacitance type sensor to be generated or the output signal is invalidated even if it is generated. For example, the dead zone 120 may be implemented by not providing the electrodes therein. It is noted that a width W4 of the dead zone 120 on the nearer side of the touch operation surface may be equal to a width W5 of the dead zone 120 on other three sides.

Preferably, the touch operation surface of the coordinate detection part 12 is set higher than the surface surrounding the touch pad 110. For example, in the example illustrated in FIG. 15, the touch operation surface of the coordinate detection part 12 is set higher than the surface of the console box 8 around the touch pad 110. With this arrangement, the operability of the pressing down operation while touching only the dead zone 120 of the touch pad 110 is increased. However, the touch operation surface of the coordinate detection part 12 may be coplanar with the surface surrounding the touch pad 110, or may be lower than the surface surrounding the touch pad 110.

According to the example illustrated in FIG. 14 and FIG. 15, the dead zone 120 is provided on the touch operation surface of the coordinate detection part 12, which enables distinguishing the pressing down operation on an effective zone (where the touch of the finger thereon causes the coordinate signal to be generated) of the touch operation surface from the pressing down operation on the dead zone 120 of the touch operation surface based on the presence or absence of the coordinate signal at the time of the enter signal being generated. As a result of this, the different functions can be implemented, based on the distinction result, between the cases of the pressing down operation on the effective zone of the touch operation surface and the pressing down operation on the dead zone 120 of the touch operation surface, which enables space saving while increasing the operability. Specifically, the enter operation is implemented at the time of the pressing down operation on the effective zone of the touch operation surface, while the list scroll, etc., can be implemented at the time of the pressing down operation on the dead zone 120 of the touch operation surface. As a result of this, it becomes unnecessary to separately provide the mechanical switch for the scroll operation, which enables saving the space. However, if necessary, the mechanical switch for the scroll operation may be provided separately. Further, it becomes possible to omit the button for scrolling 72 in the operation image area, which enables saving the space in the operation image area. However, if necessary, the button for scrolling 72 in the operation image area may be maintained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention. Further, all or part of the components of the embodiments described above can be combined.

For example, the embodiments described above are related to the operation apparatus for vehicle 1; however, they are applicable to various operation apparatuses used not for the vehicle (operation apparatuses for ships, machines such as robots, etc.).

Further, according to the embodiments described above, the electrostatic capacitance type sensor is used in the mechanism for detecting the touch operation on the touch pad 10; however, other principles (sensors) may be used to detect the touch operation. For example, the touch pad 10 may be formed of a touch panel of an surface acoustic wave type.

Further, according to the embodiments described above, the position of the cursor 80 is determined in the absolute coordinate mode; however, the position of the cursor 80 may be determined in a relative coordinate mode. It is noted that, according to the relative coordinate mode, the coordinate system of the image area of the display 20 corresponds to the coordinate system of the operation surface of the touch pad 10 in a relatively synchronized manner. According to the relative coordinate mode, typically, the coordinate system of the image area of the display 20 is associated with the coordinate system of the operation surface of the touch pad 10 in such a manner that the original point of the coordinate system of the image area of the display 20 is located at the current position of the cursor 80 and the original point of the coordinate system of the operation surface of the touch pad 10 is located at the current touch position of the finger on the operation surface.

Further, according to the embodiments described above, the position of the cursor 80 is determined in the absolute coordinate mode; however, the absolute coordinate mode and the relative coordinate mode may be switched if necessary. For example, the relative coordinate mode may be implemented when any one of the selection target items in the operation image area on the display 20 is selected (i.e., in the selected state), while the absolute coordinate mode may be implemented when any one of the selection target items in the operation image area on the display 20 is not selected (i.e., the cursor 80 is note displayed).

Further, according to the embodiments described above, the cursor 80 is used to indicate the relationship between the touch position of the finger of the user on the touch operation surface of the touch pad 10 and the position of the image area on the display 20; however, such a pointer used in an ordinary PC (personal computer), etc., may be used. Even if the pointer is used, the cursor 80 (identifying the selected state) may be maintained.

The invention claimed is:

1. An operation apparatus, comprising:
   a touch operation surface that is configured to move in up and down directions perpendicular to the touch operation surface, has a sensor provided therein for outputting a signal representing a touch of a finger thereon, and has an outer frame element or a dead zone provided at an outer region thereof, the outer frame element or the dead zone not causing the signal of the sensor to be output even when the finger touches thereon;
   a downward movement detection part that outputs a signal representing a movement of the touch operation surface in the down direction; and
   a control device that executes, when the movement of the touch operation surface in the down direction due to a pressing down operation is detected based on the signal output from the downward movement detection part while the touch of the finger parallel to the touch operation surface is not detected based on the signal output from the sensor, at least one of:
      scrolling lists in an image area or the image area itself displayed in a display that is located remotely with respect to the touch operation surface,
      changing the image area displayed on the display to another image area, and
      successively moving a cursor in the image area displayed on the display,
   wherein the control device scrolls lists in an operation image area when the movement of the touch operation surface in the down direction is detected while the touch of the finger parallel to the touch operation surface is not detected, and
   wherein the control device performs scrolling upon the movement of the touch operation surface in the down direction being detected and the touch of the finger parallel to the touch operation surface not being detected under a situation where a cursor or a pointer is located in a list display area of the operation image area, the list display area including the lists displayed therein; and implements a function of a selected selection target item in the operation image area upon the movement of the touch operation surface in the down direction being detected and the touch of the finger parallel to the touch operation surface not being detected under a situation where the cursor or the pointer is not located in the list display area of the operation image area.

2. The operation apparatus of claim 1, wherein the control device scrolls a map image area when the movement of the touch operation surface in the down direction is detected while the touch of the finger parallel to the touch operation surface is not detected.

3. The operation apparatus of claim 2, wherein the control device determines a scroll direction based on a position of the cursor or the pointer in the image area displayed on the display.

4. The operation apparatus of claim 2, wherein the sensor is an electrostatic capacitance type sensor, and
   the control device determines a scroll direction based on the signal output from the electrostatic capacitance type sensor.

5. The operation apparatus of claim 1, wherein the control device determines a scroll direction based on a position of the cursor or the pointer in the image area displayed on the display.

6. The operation apparatus of claim 5, wherein the control device sets a first direction as the scroll direction when the cursor or the pointer is located in a first area of the image area displayed on the display, and sets a second direction as the scroll direction, the second direction being opposite to the first direction, when the cursor or the pointer is located in a second area of the image area displayed on the display, the second area being located on an opposite side with respect to the first area.

7. An operation apparatus comprising:
   a touch operation surface that is configured to move in up and down directions perpendicular to the touch operation surface, has a sensor provided therein for outputting a signal representing a touch of a finger thereon, and has an outer frame element or a dead zone provided at an outer region thereof, the outer frame element or the dead zone not causing the signal of the sensor to be output even when the finger touches thereon;
   a downward movement detection part that outputs a signal representing a movement of the touch operation surface in the down direction; and
   a control device that executes, when the movement of the touch operation surface in the down direction due to a pressing down operation is detected based on the signal output from the downward movement detection part while the touch of the finger parallel to the touch operation surface is not detected based on the signal output from the sensor, at least one of:
      scrolling lists in an image area or the image area itself displayed in a display that is located remotely with respect to the touch operation surface,
      changing the image area displayed on the display to another image area, and
      successively moving a cursor in the image area displayed on the display,
   wherein the control device scrolls lists in an operation image area when the movement of the touch operation surface in the down direction is detected while the touch of the finger parallel to the touch operation surface is not detected,
   wherein the sensor is an electrostatic capacitance type sensor, and the control device determines a scroll direction based on the signal output from the electrostatic capacitance type sensor,
   wherein the control device detects the touch of the finger when a level of the signal output from the electrostatic capacitance type sensor is greater than or equal to a predetermined reference value, and
   wherein the control device sets a first direction as the scroll direction when the level of the signal output from the electrostatic capacitance type sensor is greater than or equal to a predetermined threshold but less than the predetermined reference value, and sets a second direction as the scroll direction, the second direction being opposite to the first direction, when the level of the signal output from the electrostatic capacitance type sensor is less than the predetermined threshold and less than the predetermined reference value.

8. The operation apparatus of claim 7, wherein the first direction corresponds to an upward direction, and the second direction corresponds to a downward direction.

* * * * *